United States Patent [19]

Sakaguchi et al.

[11] 4,016,083
[45] Apr. 5, 1977

[54] SPIRALLY-WOUND MEMBRANE-TYPE SEPARATOR MODULE CAPABLE OF REVERSING THE DIRECTION OF LIQUID FLOW

[75] Inventors: Yasuhiro Sakaguchi, Yokohama; Junichi Koike, Ohimachi; Takehisa Kubo, Ohmiya, all of Japan

[73] Assignee: Daicel, Ltd., Osaka, Japan

[22] Filed: Dec. 15, 1975

[21] Appl. No.: 640,754

[30] Foreign Application Priority Data

Dec. 18, 1974 Japan ............................ 49-153344

[52] U.S. Cl. ...................... 210/433 M; 210/494 R
[51] Int. Cl.² ........................................ B01D 31/00
[58] Field of Search ............ 210/23 H, 494, 321 R, 210/433 M

[56] References Cited

UNITED STATES PATENTS

| 3,386,583 | 6/1968 | Merten | 210/321 R |
| 3,505,215 | 4/1970 | Bray | 210/321 R X |
| 3,536,612 | 10/1970 | Kopecek et al. | 210/23 H |
| 3,819,513 | 6/1974 | Ishii et al. | 210/321 R X |
| 3,883,431 | 5/1975 | Ishii et al. | 210/23 H X |

*Primary Examiner*—Frank A. Spear, Jr.
*Attorney, Agent, or Firm*—Woodhams, Blanchard and Flynn

[57] ABSTRACT

A spirally-wound membrane-type separator module capable of reversing the direction of liquid flow comprises an outer cylindrical pressure vessel, a spirally-wound membrane element disposed within said outer vessel and extending in the axial direction thereof, and a plurality of brine seals disposed in the annular space defined between the outer periphery of said membrane element and the inner periphery of said outer vessel, each brine seal including a ring-like portion fitted on the outer periphery of said element and a cup-shaped flange portion sealingly engaging the inner periphery of said outer vessel, said brine seals being arranged close to one another in the direction of axis of the element with the flange portions of the brine seals being directed in opposite directions.

4 Claims, 4 Drawing Figures

INVENTION

INVENTION

COMPARISON

SPIRALLY-WOUND MEMBRANE-TYPE SEPARATOR MODULE CAPABLE OF REVERSING THE DIRECTION OF LIQUID FLOW

BACKGROUND OF THE INVENTION

1. Field of the Invention

This invention relates to a spirally-wound membrane-type separator module capable of reversing the direction of flow of the feed liquid.

2. Description of the Prior Art

In the usual spirally-wound membrane-type separator module for reverse osmosis operations, contamination of the membrane is inevitable, and it has been conventional to clean the membrane by supplying water or a liquid chemical under the normal operating pressure of the reverse osmosis operation.

A prior art spirally-wound membrane-type separator module is shown in FIG. 1, wherein a brine seal 3 is provided sealing the space between the outer cylindrical pressure vessel 2 and the spirally-wound membrane element or module 1 so that the module will not be by-passed by the feed liquid. As a consequence, the effective flow of the feed liquid in the module is limited to only one direction. Therefore, the cleaning of the module membrane is carried out by supplying liquid only in that one direction, which is very inefficient in view of the cleaning effect and the time required therefor. The prior art apparatus of FIG. 1 also includes an inlet 4 for the feed liquid, an outlet 5 for the concentrated feed liquid (concentrate) and an outlet 6 for the product water (permeate).

For purposes of convenience in description, the feed liquid supplied to inlet 4 is sometimes referred to as brine and the permeate liquid discharged through 6 is sometimes referred to as product water. These terms thus refer to a typical operation for desalinating brackish water. It will be understood, however, that other types of feed liquids can be used so that these terms shall have no limiting significance.

SUMMARY OF THE INVENTION

An object of the present invention is to mount a plurality of brine seals on the separating membrane element so that the flange portions of the brine seals are directed in opposite directions, thus permitting the feed liquid to be supplied, alternatively, in both directions so as effectively to pass through the membrane of the element, and thus provide an efficient spirally wound membrane-type film separator module capable of reversing the direction of feed liquid supply and permitting the cleaning period to be reduced to from one-half to one-third the time required when the feed liquid is supplied only in one direction.

Figure 1:
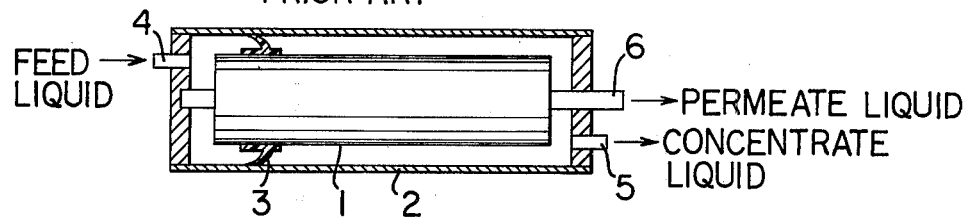
FIG. 1 is a schematic, longitudinal, central sectional view of a prior art spirally wound membrane-type separator module.

Embodiments of the invention will now be described with reference to the drawing.

Figure 2:
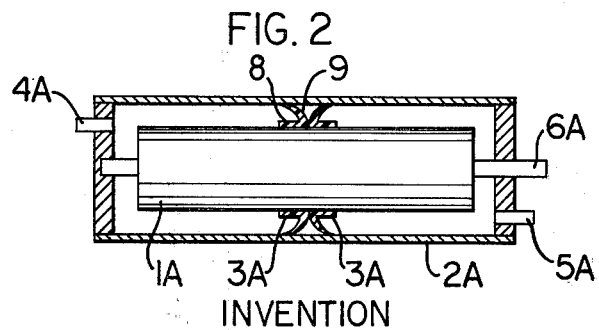
FIG. 2 is a corresponding view showing an embodiment of the invention, namely, a spirally wound membrane-type separator module capable of reversing the direction of liquid supply.

Referring to FIG. 2 a spirally-wound separating membrane element or module 1A is disposed inside of and spaced radially inwardly from an outer cylindrical pressure vessel 2A and extends axially therein. The pressure vessel 2A is sealed at its opposite axial ends by end walls, and it is provided at one end with an inlet 4A for feed liquid and at its other end with an outlet 5A for treated liquid (concentrate). The separating membrane element 1A has an outlet 6A for the liquid that permeates through the membrane.

The separating element 1A is a spirally-wound semipermeable membrane of the type conventionally used in reverse osmosis separation operations. Spirally-wound membrane modules comprise one or more leaves wrapped spirally around the product water outlet tube 6A. Each leave comprises a semi-permeable membrane, a porous product-water-side backing material and a brine-side flow spacer. The membrane is bonded along the two sides, at the end and around the product water outlet tube, forming a sealed envelope that encloses the backing material except at the end that opens to the product water outlet tube. The brine flow spacer is placed on the membrane and the several layers are then spirally wrapped around the product water tube to form a cylindrical module. In operation the module is placed in a snug-fitting cylindrical pressure vessel 2A, feed water is flowed axially in at one end of the vessel, axially through the module in the passage provided by the brine side spacer and out the other axial end of the module. Product water that permeates through the membrane is collected in the backing material and spirals inward to the product water outlet tube 6A and is collected there. The tube 6A extends through an end wall of the vessel 1A and the product water escapes therethrough. These modules are well-known, commercially available items and are sometimes referred to a ROGA modules.

The outer periphery of the element 1A and the inner periphery of the outer cylinder 2A define an annular space, and in this space there are provided a plurality of brine seals 3A which are disposed close to one another. The brine seals are fitted on the outer periphery of the element 1 and sealingly contact the inner periphery of the outer cylinder 2. Each brine seal 3A has a radially inner ring-like or cylindrical portion 8 fitted on the outer periphery of the element and sealed thereto and a cup-shaped or concavo-convex flange portion 9 whose radially outer edge sealingly engages the inner periphery of the outer vessel 2A. The brine seals 3A are made of a material selected according to the feed liquid treated and the conditions of use, for instance, "Neoprene" rubber, silicone rubber, polytetrafluoroethylene or polytrifluoromonochloroethylene, vulcanized natural rubber or elastic synthetic resin.

The brine seals 3A are arranged close to each other in the axial direction of the element 1 and the concavities of their flange portions open in opposite axial directions.

The pressure of the feed liquid supplied at 4A will act on the leftward flange portion to maintain same in snug sealing engagement with the internal wall of the pressure vessel. When the direction of flow of the feed liquid is reversed, so that the feed liquid is supplied through 5A, the same effect will occur on the rightward flange portion. In both cases, the feed liquid is prevented from by-passing the module.

With the spirally wound membrane-type separator module which is capable of reversing the direction of liquid flow, effective cleaning can be obtained by reversing the direction of flow of the feed liquid. Accordingly, a plurality of brine seals 3A are mounted on the separating membrane element 1A as shown in FIG. 2, that is, the individual brine seals effect their sealing role in opposite directions (i.e., in the opposite directions in which the respective flange portions are directed), so that feed liquid can be supplied in opposite directions so that it may effectively pass through the membrane of the element. Experiments proved that by reversing the direction of supply of the feed liquid every 5 minutes, the time required for cleaning the membrane was reduced to one-half to one-third as compared to the case of continuously supplying the feed liquid only in one direction. Further, it was recognized that the contamination of the membrane could be prevented extremely effectively by reversing the direction of flow of the feed liquid at regular constant time intervals in the treatment of the feed liquid by the reverse osmosis method or with the ultrafiltration method.

Figure 3:
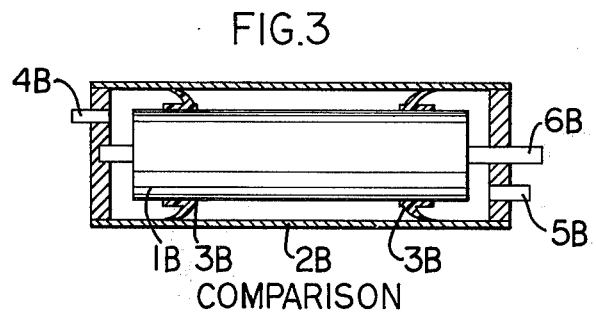
FIG. 3 is a corresponding view of a comparative structure, namely, a spirally wound membrane-type separator module provided with two brine seals axially spaced apart from one another and capable of reversing the direction of liquid supply.
Figure 4:
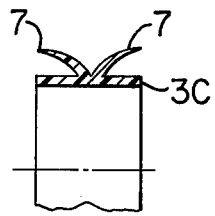
FIG. 4 is a fragmentary sectional view showing a brine seal used in a further embodiment of the invention.

The afore-mentioned two adjacent brine seals 3A are by no means limiting, and it is possible to use a single brine seal 3C having oppositely directed cup-shaped flange portions as shown in FIG. 4. On the other hand, when a plurality of brine seals 3B are mounted on the module at positions axially spaced apart from one another as shown in FIG. 3, air that accumulates in the space defined by and between adjacent brine seals, and the outer vessel, will not be discharged and this will sometimes lead to deformation and breakage of the membrane element if the liquid being supplied is pressurized. Therefore, the plurality of brine seals have to be mounted on the element at as close a spacing to each other as is possible. The aforementioned single brine seal of FIG. 4 is superior in view of the prevention of the deformation and breakage of the element.

The embodiments of the invention in which an exclusive property or privilege is claimed are defined as follows:

1. An apparatus for semi-permeable membrane separation processes, comprising: an outer cylindrical pressure vessel; a spirally-wound cylindrical membrane module disposed within said pressure vessel and extending axially therein, said module being radially spaced from said pressure vessel; seal means disposed in the space between said module and said pressure vessel, said seal means including an inner ring portion sleeved on said module and in substantially sealed relationship therewith and a pair of concave flange portions extending outwardly from the ring portion into substantially sealed relationship with the inner surface of said pressure vessel, the concavities of said flange portions opening toward opposite axial ends of said pressure vessel.

2. An apparatus as claimed in claim 1, in which said seal means comprises two separate annular members which are in axially abutting relationship with their flange portions in close proximity to each other.

3. An apparatus as claimed in claim 1, in which said seal means consists of a one-piece member having a ring portion sleeved on said module and a pair of concave flange portions extending outwardly from said ring portion.

4. An apparatus as claimed in claim 1, in which said seal means is located at approximately the longitudinal midpoint of said module.

* * * * *